US010951867B2

(12) United States Patent
Pappas et al.

(10) Patent No.: US 10,951,867 B2
(45) Date of Patent: Mar. 16, 2021

(54) LIGHT EMITTER ARCHITECTURE FOR SCANNING DISPLAY DEVICE

(71) Applicant: Facebook Technologies, LLC, Menlo Park, CA (US)

(72) Inventors: Ilias Pappas, Cork (IE); William Thomas Blank, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 333 days.

(21) Appl. No.: 16/019,342

(22) Filed: Jun. 26, 2018

(65) Prior Publication Data

US 2019/0020858 A1 Jan. 17, 2019

Related U.S. Application Data

(60) Provisional application No. 62/531,771, filed on Jul. 12, 2017.

(51) Int. Cl.
| | |
|---|---|
| *H04N 9/31* | (2006.01) |
| *G02B 26/10* | (2006.01) |
| *G02B 27/01* | (2006.01) |
| *G02B 27/09* | (2006.01) |

(52) U.S. Cl.
CPC ......... *H04N 9/3129* (2013.01); *G02B 26/10* (2013.01); *G02B 27/01* (2013.01); *G02B 27/09* (2013.01); *H04N 9/3138* (2013.01)

(58) Field of Classification Search
None
See application file for complete search history.

(56) References Cited

U.S. PATENT DOCUMENTS

| | | | |
|---|---|---|---|
| 2001/0050661 A1 | 12/2001 | Noda et al. | |
| 2006/0044297 A1 | 3/2006 | Furukawa et al. | |
| 2007/0296645 A1 | 12/2007 | Lee et al. | |
| 2009/0128786 A1 | 5/2009 | Lieb et al. | |
| 2012/0280972 A1 | 11/2012 | Champion | |
| 2018/0115771 A1* | 4/2018 | Kwon | H04N 13/317 |
| 2019/0020858 A1* | 1/2019 | Pappas | G02B 27/0101 |
| 2020/0013342 A1* | 1/2020 | Yamashita | G09G 3/3266 |
| 2020/0074949 A1* | 3/2020 | Morein | G09G 3/342 |

OTHER PUBLICATIONS

PCT International Search Report and Written Opinion, PCT Application No. PCT/US2018/041586, dated Nov. 1, 2018, 17 pages.

* cited by examiner

*Primary Examiner* — Jennifer D. Carruth
(74) *Attorney, Agent, or Firm* — Fenwick & West LLP

(57) ABSTRACT

A scanning type display device includes a light source that includes multiple rows and columns of light emitters. The display device also includes a rotatable mirror that projects light to different areas of an image field as the mirror rotates. There can be a redundant number to light emitters in the light source to increase the brightness of the pixels in the image field. A data driver may replicate and shift data values among light emitters of the same columns. The light emitters may operate in conjunction with the mirror in a synchronized manner. Owing to the shift in data value and the rotation of the mirror, the mirror may first project light from a first light emitter to a pixel and may then project light from a second light emitter with the same brightness level to the same pixel. The shifting may continue for additional light emitters.

17 Claims, 13 Drawing Sheets

LIGHT EMITTER ARCHITECTURE FOR SCANNING DISPLAY DEVICE

CROSS REFERENCE TO RELATED APPLICATION

This application claims the benefit of U.S. Provisional Application No. 62/531,771, filed Jul. 12, 2017, which is incorporated by reference in its entirety.

BACKGROUND

This disclosure relates to structure and operation of a display device and more specifically to shifting of data signals to different light sources in a scan-type display device.

In a full-color display device, three different color (Red (R), Green (G), Blue (B)) light emitters are placed on a silicon substrate. To control the light emitters, conventionally, a dedicated line is used to connect each light emitter to a controller. Such configuration requires a large number of lines to connect all light emitters for a high-resolution display device.

Active matrix is one way of addressing this issue by having light emitters controlled by multiplexing signals. Light emitters of each row in the active matrix have a switch transistor and all the switches of the same row are controlled by the same signal (i.e., a scan signal). At the same time, the three RGB light emitters of the same column also share the same IC data output. Hence, during each time, first Red light emitters are selected by a Red scan signal and all Red light emitters are programmed simultaneously. The Green row and the Blue row are then selected sequentially. In this way, the number of lines for addressing the light emitters can be reduced. However, since the emitting time of each light emitter is usually a portion of a period of time, the frequency and the driving current for each light emitter have to be multiple times higher than direct addressing in order to obtain the same brightness.

SUMMARY

Embodiments described herein generally relate to a scanning type display device with multiple rows and columns of individual light emitters that receive data signals that are shifted in a synchronized manner so that light from different light emitters with a specific brightness level is projected to a pixel within an image frame. Two or more rows of light emitters are provided for each color (R, G, or B). The display device includes a rotatable mirror that projects emitted light to an image field. As the mirror rotates, light is projected to different areas of the image field. As the light completes scanning of the image field, an image is formed on the image field. During a cycle of the mirror rotation, a pixel in the image field is illuminated by light emitters of the same color as well as light emitters of different colors. The overall color value of a given pixel is, thus, a temporal average of the light projected to the pixel.

In accordance with an embodiment, a data shift technique is used to operate multiple light emitters in a column. A display device may include a data driver that provides data signals to light emitters to control the brightness levels at which the light emitters operate. The display device loads data values into the data driver. In turn, the data driver sends a data signal representing a data value to a first light emitter in the column. As such, the first light emitter operates at a brightness level according to the data signal in a first portion of a frame period. The data driver then shifts the data signal to a second light emitter in the same column so that the second light emitter operates at the same brightness level according to the shifted data signal in the second portion of the frame period.

This operation of the light emitters may be synchronized with the rotation of the mirror that projects light to the image field. In the first portion of the frame period, the mirror can be rotated to a first position to project light emitted from the first light emitter to a pixel of the image field. In the second portion of the frame period, the mirror can be rotated to a second position to project light emitted from the second light emitter to the same pixel that was illuminated by the first light emitter in the first portion of the frame period. The light projected to the pixel in the first portion of the frame period and the light projected to the pixel in the second portion of the frame period may have the same brightness level due to the shift in data signals. As such, the pixel is illuminated two or more times within a frame period so that the brightness of the display device is increased.

The figures depict embodiments of the present disclosure for purposes of illustration only.

DETAILED DESCRIPTION

Embodiments relate to a scanning-type display device including multiple rows of light emitters arranged in an active matrix having a data driver that replicates and shifts data signals to different light emitters. A mirror rotates to project light emitted from the light emitters to different locations of an image field. As the mirror rotates, a given pixel in the image field is illuminated by different light emitters. Data signals are shifted to among those light emitters so that the color value of the pixel can be precisely controlled. In some cases, light from multiple light emitters of the same color is sequentially projected to the same pixel to increase the overall brightness of the pixel. Light emitters of different colors may also project light to the same pixel to control the color value of the pixel.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Near-Eye Display

Figure 1:
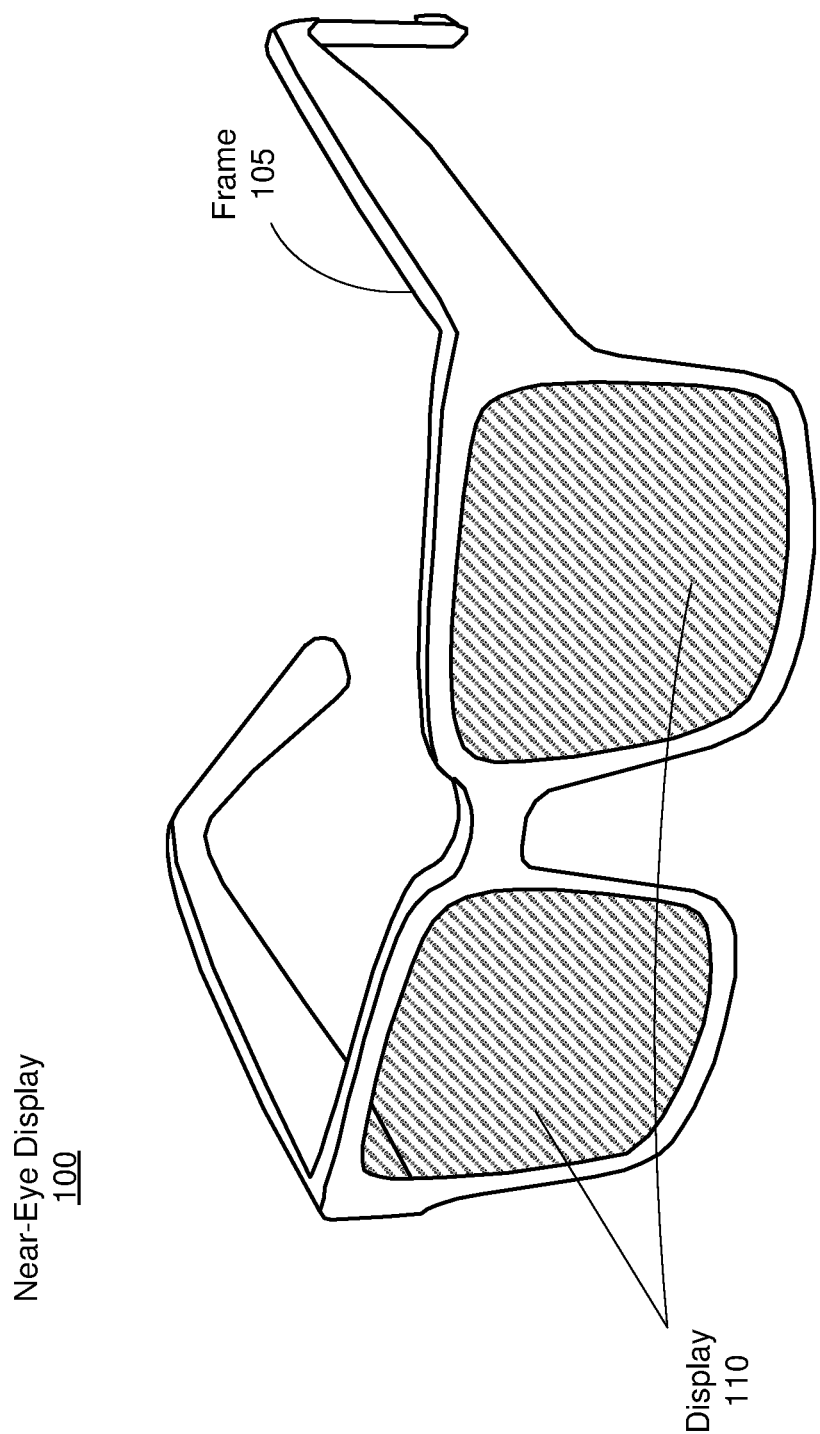
FIG. 1 is a perspective view of a near-eye-display (NED), in accordance with an embodiment.

FIG. 1 is a diagram of a near-eye display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 may operate as a VR NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least a source assembly to generate an image light to present media to an eye of the user. The source assembly includes, e.g., a light source, an optics system, or some combination thereof.

FIG. 1 is only an example of a VR system. However, in alternate embodiments, FIG. 1 may also be referred to as a Head-Mounted-Display (HMD).

Figure 2:
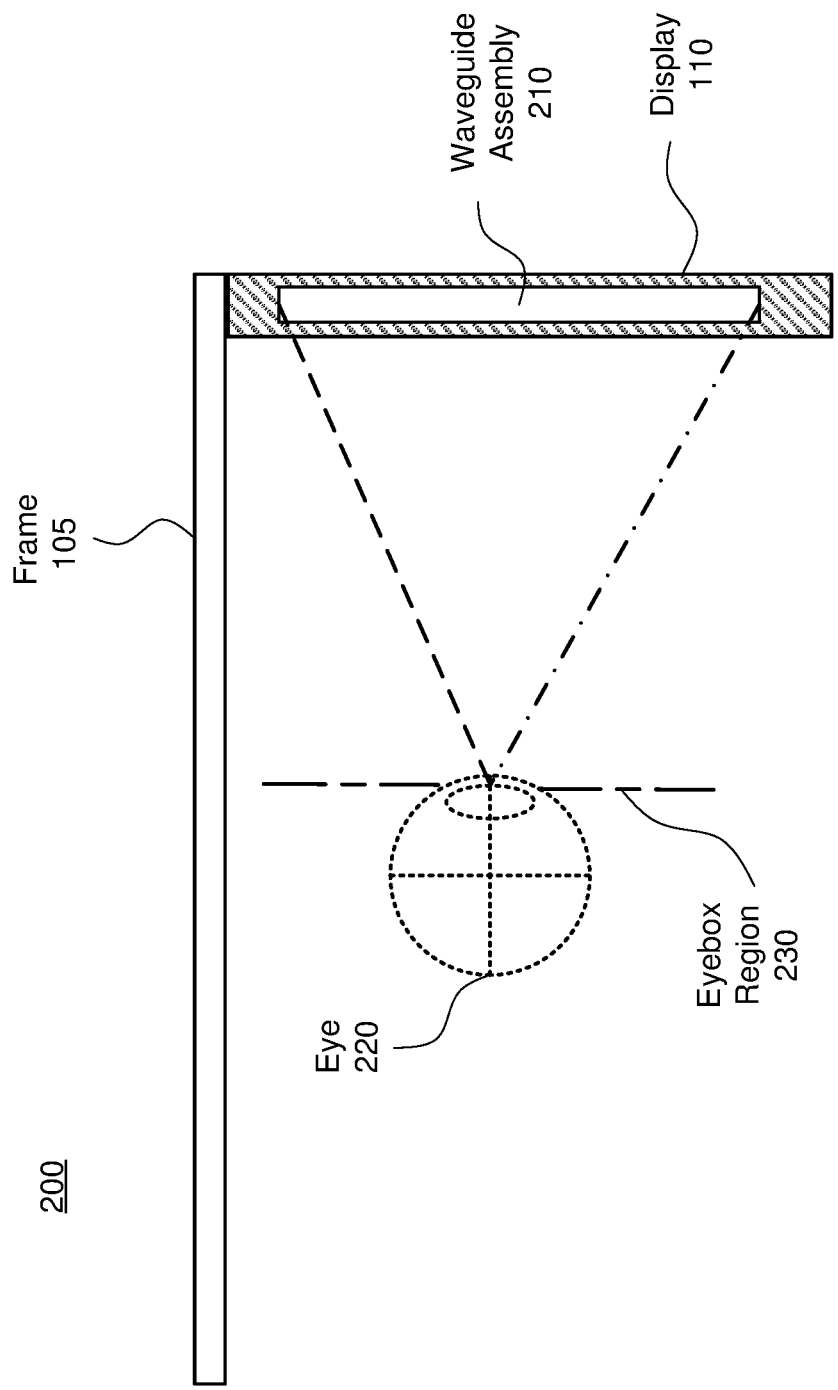
FIG. 2 is a cross-section of an eyewear of the NED illustrated in FIG. 1, in accordance with an embodiment.

FIG. 2 is a cross section 200 of the NED 100 illustrated in FIG. 1, in accordance with an embodiment. The cross section 200 illustrates at least one waveguide assembly 210. An exit pupil is a location where the eye 220 is positioned in an eyebox region 230 when the user wears the NED 100. In some embodiments, the frame 105 may represent a frame of eye-wear glasses. For purposes of illustration, FIG. 2 shows the cross section 200 associated with a single eye 220 and a single waveguide assembly 210, but in alternative embodiments not shown, another waveguide assembly which is separate from the waveguide assembly 210 shown in FIG. 2, provides image light to another eye 220 of the user.

The waveguide assembly 210, as illustrated below in FIG. 2, directs the image light to the eye 220 through the exit pupil. The waveguide assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the waveguide assembly 210 and the eye 220. The optical elements may act to, e.g., correct aberrations in image light emitted from the waveguide assembly 210, magnify image light emitted from the waveguide assembly 210, some other optical adjustment of image light emitted from the waveguide assembly 210, or some combination thereof. The example for optical elements may include an aperture, a Fresnel lens, a convex lens, a concave lens, a filter, or any other suitable optical element that affects image light.

Figure 3:
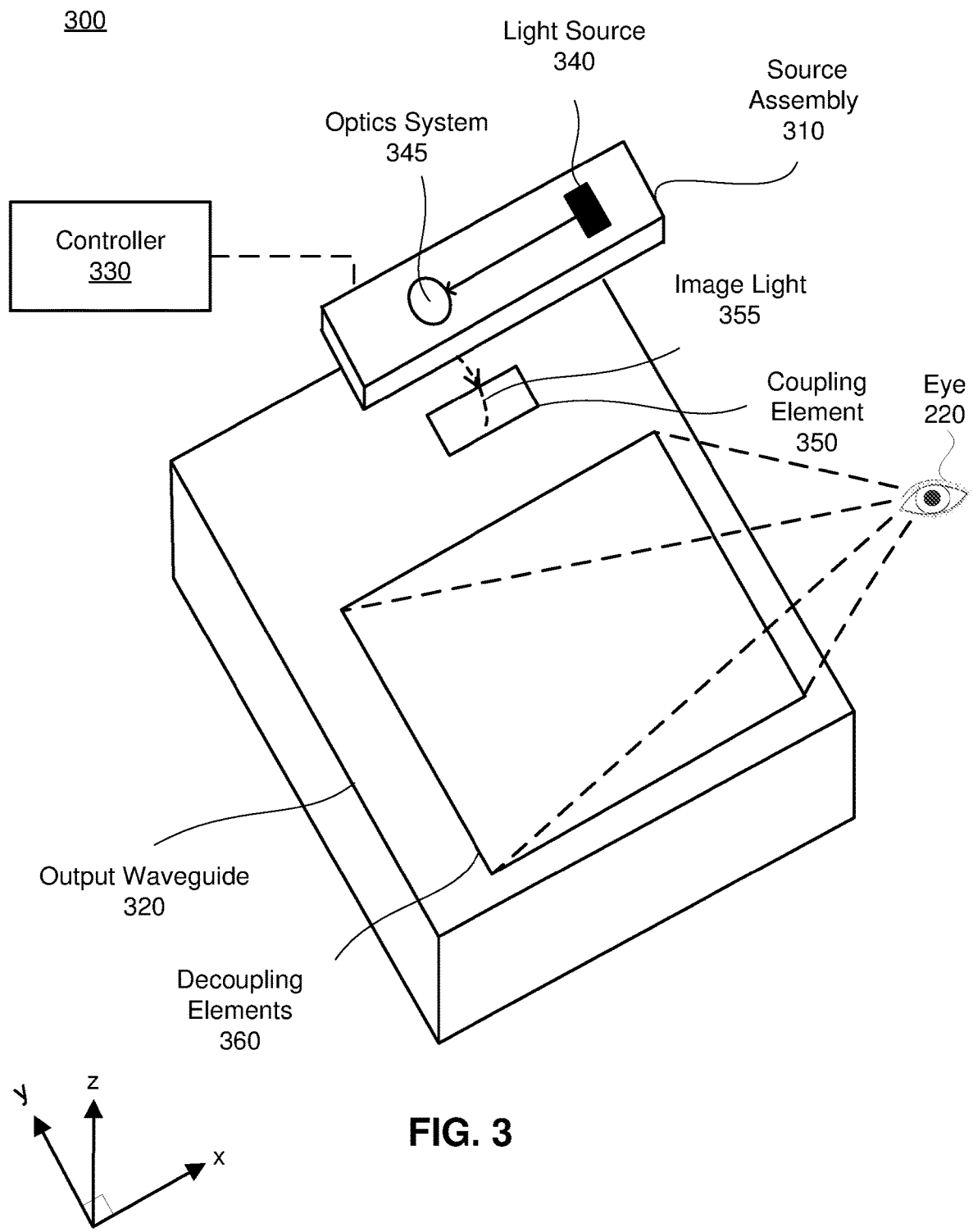
FIG. 3 is a perspective view of a waveguide display, in accordance with an embodiment.

FIG. 3 illustrates a perspective view of a waveguide display 300, in accordance with an embodiment. In some embodiments, the waveguide display 300 (may also be referred to as a scanning waveguide display) is a component (e.g., the waveguide assembly 210 or part of the waveguide assembly 210) of the NED 100. In alternative embodiments, the waveguide display 300 is part of some other NED, or another system that directs display image light to a particular location.

The waveguide display 300 includes a source assembly 310, an output waveguide 320, and a controller 330. The waveguide display 300 may provide images for both eyes or for a single eye. For purposes of illustration, FIG. 3 shows the waveguide display 300 associated with a single eye 220. Another waveguide display (not shown), separated (or partially separated) from the waveguide display 300, provides image light to another eye of the user. In a partially separated system, one or more components may be shared between waveguide displays for each eye.

The source assembly 310 generates image light 355. The source assembly 310 includes a light source 340 and an optics system 345. The light source 340 is an optical component that generates image light using a plurality of light emitters arranged in a matrix. The light source 340 generates an image light including, but not restricted to, a Red image light, a Blue image light, a Green image light, an infra-red image light, etc.

The optics system 345 performs a set of optical processes, including, but not restricted to, focusing, combining, conditioning, and scanning processes on the image light generated by the light source 340. In some embodiments, the optics system 345 includes a combining assembly, a light conditioning assembly, and a scanning mirror assembly, as described below in detail in conjunction with FIG. 4. The source assembly 310 generates and outputs an image light 355 to a coupling element 350 of the output waveguide 320.

The output waveguide 320 is an optical waveguide that outputs image light to an eye 220 of a user. The output waveguide 320 receives the image light 355 at one or more coupling elements 350, and guides the received input image light to one or more decoupling elements 360. The coupling element 350 may be, e.g., a diffraction grating, a holographic grating, some other element that couples the image light 355 into the output waveguide 320, or some combination thereof. For example, in embodiments where the coupling element 350 is diffraction grating, the pitch of the diffraction grating is chosen such that total internal reflection occurs, and the image light 355 propagates internally toward the decoupling element 360. The pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. An orientation and position of the image light exiting from the output waveguide 320 are controlled by changing an orientation and position of the image light 355 entering the coupling element 350. The pitch of the diffraction grating may be in the range of 300 nm to 600 nm.

The output waveguide 320 may be composed of one or more materials that facilitate total internal reflection of the image light 355. The output waveguide 320 may be composed of e.g., silicon, plastic, glass, or polymers, or some combination thereof. The output waveguide 320 has a relatively small form factor. For example, the output waveguide 320 may be approximately 50 mm wide along X-dimension, 30 mm long along Y-dimension and 0.5-1 mm thick along Z-dimension.

The controller 330 controls the scanning operations of the source assembly 310. The controller 330 determines scanning instructions for the source assembly 310 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 310 to generate image light 355. The scanning instructions may include, e.g., a type of a source of image light (e.g., monochromatic, polychromatic), a scanning rate, an orientation of a scanning apparatus, one or more illumination parameters, or some combination thereof. The controller 330 includes a combination of hardware, software, and/or firmware not shown here so as not to obscure other aspects of the disclosure.

Figure 4:
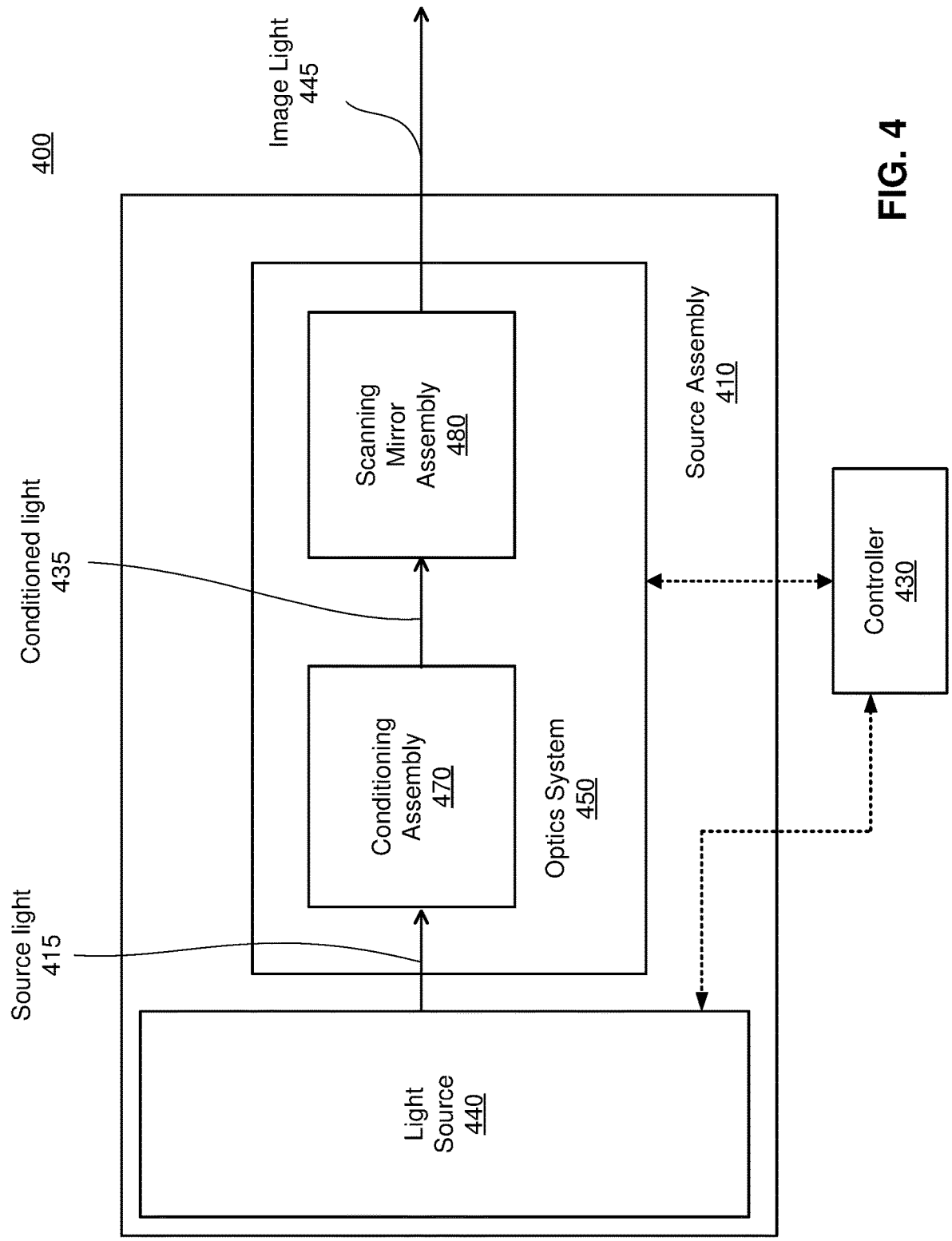
FIG. 4 illustrates a block diagram of a source assembly, in accordance with an embodiment.

FIG. 4 illustrates a cross section 400 of the source assembly 410, in accordance with an embodiment. The source assembly 410 is an embodiment of the source assembly 310 shown in FIG. 3. The source assembly 410 includes a light source 440 and an optics system 450. The light source 440 is an embodiment of the light source 340 of FIG. 3. The optics system 450 is an embodiment of the optics system 345 of FIG. 3.

The source assembly 410 generates light in accordance with scanning instructions from a controller 430. The light source 440 is may generate a spatially coherent or a partially spatially coherent image light. The light source 440 may include multiple light emitters. The light emitters can be vertical cavity surface emitting laser (VCSEL) devices, light emitting diodes (LEDs), microLEDs, tunable lasers, and/or some other light-emitting devices. The light source 440 emits light in a visible band (e.g., from about 390 nm to 700 nm). The light may be continuous or pulsed. The light source 440 emits light in accordance with one or more illumination parameters set by or received from the controller 430. An illumination parameter is an instruction used by the light source 440 to generate light. An illumination parameter may include, e.g., source wavelength, pulse rate, pulse amplitude, beam type (continuous or pulsed), other parameter(s) that affect the emitted light, or some combination thereof. The light source 440 emits source light 415. In some embodiments, the source light 415 includes multiple beams of Red light, Green light, Blue light, and infra-red light, or some combination thereof.

The optics system 450 includes one or more optical components that condition the light from the light source 440. Conditioning light from the light source 440 may include, e.g., expanding, collimating, adjusting orientation in accordance with instructions from the controller 430, some other adjustment of the light, or some combination thereof. The one or more optical components may include, e.g., lenses, mirrors, apertures, gratings, or some combination thereof. Light emitted from the optics system 450 is referred to as an image light 445. The optics system 450 outputs the image light 445 at a particular orientation (in accordance with the scanning instructions) toward the output waveguide 320 (shown in FIG. 3).

The optics system 450 can include a light conditioning assembly 470 and a scanning mirror assembly 480. The light conditioning assembly 470 conditions the source light 415 and emits a conditioned light 435 to the scanning mirror assembly 480. The conditioned light 435 is a light conditioned for incidence on the scanning mirror assembly 480. The light conditioning assembly 470 includes one or more optical components that condition the light from the light source 440. Conditioning light from the light source 440 may include, e.g., expanding, collimating, correcting for one or more optical errors (e.g., field curvature, chromatic aberration, etc.), some other adjustment of the light, or some combination thereof. The light conditioning assembly 470 conditions the source light 415 and emits the conditioned light 435 to the scanning mirror assembly 480.

The scanning mirror assembly 480 includes one or more optical elements that redirect image light via one or more reflective portions of the scanning mirror assembly 480. Where the image light is redirected toward is based on specific orientations of the one or more reflective portions. In some embodiments, the scanning mirror assembly 480 includes a single scanning mirror that scans in at least two dimensions. In other embodiments, the scanning mirror assembly 480 may include a plurality of scanning mirrors that each scan in orthogonal directions to each other. The scanning mirror assembly 480 may perform a raster scan (horizontally, or vertically), a biresonant scan, or some combination thereof In some embodiments, the scanning mirror assembly 480 may perform a controlled vibration along the horizontal and/or vertical directions with a specific frequency of oscillation to scan along two dimensions and generate a two-dimensional projected line image of the media presented to user's eyes.

In some embodiments, the scanning mirror assembly 480 includes a galvanometer mirror. For example, the galvanometer mirror may represent any electromechanical instrument that indicates that it has sensed an electric current by deflecting a beam of image light with one or more mirrors. The galvanometer mirror may scan in at least one orthogonal dimension to generate the image light 445. The image light 445 from the galvanometer mirror represents a two-dimensional line image of the media presented to user's eyes.

The controller 430 controls the operations of light source 440 and the scanning mirror assembly 480. The operations performed by the controller 430 includes taking content for display, and dividing the content into discrete sections. The controller 430 instructs the light source 440 to sequentially present the discrete sections using individual source elements corresponding to a respective row in an image ultimately displayed to the user. The controller 430 instructs the scanning mirror assembly 480 to scan the presented discrete sections to different areas of a coupling element of the output waveguide 320 (shown in FIG. 3). Accordingly, at the exit pupil of the output waveguide 320, each discrete portion is presented in a different location. While each discrete section is presented at different times, the presentation and scanning of the discrete sections occur fast enough such that a user's eye integrates the different sections into a single image or series of images. The controller 430 may also provide scanning instructions to the light source 440 that include an address corresponding to an individual source element of the light source 440 and/or an electrical bias applied to the individual source element.

The image light 445 is an example of the image light 355 of FIG. 3. The image light 445 couples to the output waveguide 320 as described above with reference to FIG. 3.

Rotatable Mirror and Image Field

Figure 5A:
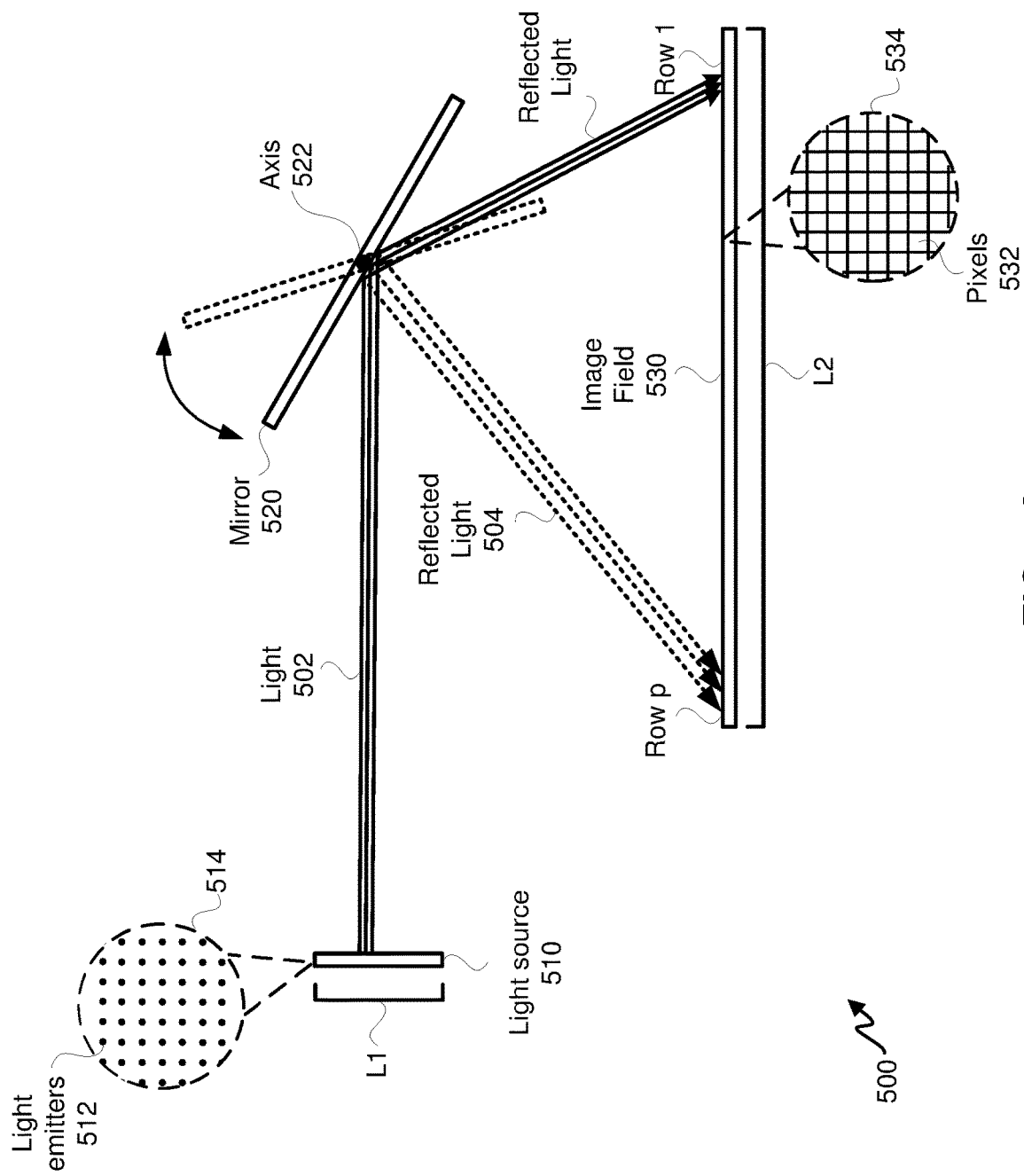
FIG. 5A is a diagram illustrating a scanning operation of a display device using a mirror to project light from a light source to an image field, in accordance with an embodiment.

FIG. 5A is a diagram illustrating a scanning operation of a display device 500 using a scanning mirror 520 to project light from a light source 510 to an image field 530, in accordance with an embodiment. The light source 510 may correspond to the light source 340 or light source 440 used in the near-eye display 100, or may be used in other display devices. The light source 510 includes multiple rows and columns of light emitters 512, as represented by the dots in inset 514. The light 502 emitted by the light source 510 may be a set of collimated beams of light. For example, the light 502 in FIG. 5 shows multiple beams that are emitted by a column of light emitters 512. Before reaching the mirror 520, the light 502 may be conditioned by different optical devices such as the conditioning assembly 470 (not shown in FIG. 5A). The mirror 520 reflects and projects the light 502 from the light source 510 to the image field 530. The mirror 520 rotates about an axis 522. The mirror 520 may be a microelectromechanical system (MEMS) mirror or any other suitable mirror. The mirror 520 may be an embodiment of the scanning mirror assembly 480 in FIG. 4 or a part of the scanning mirror assembly. As the mirror 520 rotates, the light 502 is directed to a different part of the image field 530, as illustrated by the reflected part of the light in solid lines and the reflected part of the light 504 in dash lines.

The image field 530 is an area that receives the light 502 as the mirror 520 rotates to project the light 502 in different directions. For example, the image field 530 may correspond to a portion of the coupling element 350 or a portion of the decoupling element 360 in FIG. 3. In one embodiment, the image field 530 is a surface of the coupling element 350 and the image formed on the image field 530 is magnified as light travels through the output waveguide 320. The image field 530 may also be referred to as a scan field because, when the light 502 is projected to an area of the image field 530, the area of the image field 530 is being illuminated by the light 502. The image field 530 may be spatially defined by a matrix of pixels 532 (represented by the blocks in inset 534) in rows and columns. The pixels 532 in the image field 530 sometimes may not actually be additional physical structure. Instead, the pixels 532 may be spatial regions that divide the image field 530. Also, the sizes and locations of the pixels 532 may depend on the projection of the light 502 from the light source 510. For example, at a given angle of rotation of the mirror 520, light beams emitted from the light source 510 may fall on an area of the image field 530. As such, the sizes and locations of pixels 532 of the image field 530 may be defined based on the location of each light beam.

In some cases, a pixel 532 may be subdivided spatially into subpixels (not shown). For example, a pixel 532 may include a Red subpixel, a Green subpixel, and a Blue subpixel. The Red subpixel corresponds to a location at which a Red light beam is projected, etc. When subpixels are present, the color of a pixel 532 is based on the temporal and/or spatial average of the subpixels.

The number of rows and columns of light emitters 512 of the light source 510 may or may not be the same as the number of rows and columns of the pixels 532 in the image field 530. In some embodiments, the number of light emitters 512 in a row is equal to the number of pixels 532 in a row of the image field 530 while the number of light emitters 512 in a column is two or more but fewer than the number of pixels 532 in a column of the image field 530. Put differently, in some embodiments, the light source 510 has the same number of columns of light emitters 512 as the number of columns of pixels 532 in the image field 530 but has fewer rows than the image field 530. For example, in one specific embodiment, the light source 510 has about 1280 columns of light emitters 512, which is the same as the number of columns of pixels 532 of the image field 530, but only six to fifteen rows of light emitters 512 while the scan field has 1024 rows of pixels 532. The light source 510 may have a first length L1, which is measured from the first row to the last row of light emitters 512. The image field 530 has a second length L2, which is measured from row 1 to row p of the scan field 700. In one embodiment, L2 is greater than L1 (e.g., L2 is 50 to 10,000 times greater than L1).

The terms rows and columns may describe two relative spatial relationships of elements. While, for the purpose of simplicity, a column described herein is normally associated with a vertical line of elements, it should be understood that a column does not have to be arranged vertically (or longitudinally). Likewise, a row does not have to be arranged horizontally (or laterally). A row and a column may also sometimes describe an arrangement that is non-linear. Rows and columns also do not necessarily imply any parallel or perpendicular arrangement.

Since the number of rows of pixels 532 is larger than the number of rows of light emitters 512 in some embodiments, the display device 500 uses the mirror 520 to project the light 502 to different rows of pixels at different times. As the mirror 520 rotates and the light 502 scans through the image field 530 quickly, an image is formed on the image field 530. In some embodiments, the light source 510 also has a smaller number of columns than the image field 530. The mirror 520 can rotate in two dimensions to fill the image field 530 with light (e.g., a raster-type scanning down rows then moving to new columns in the image field 530).

Figure 5B:
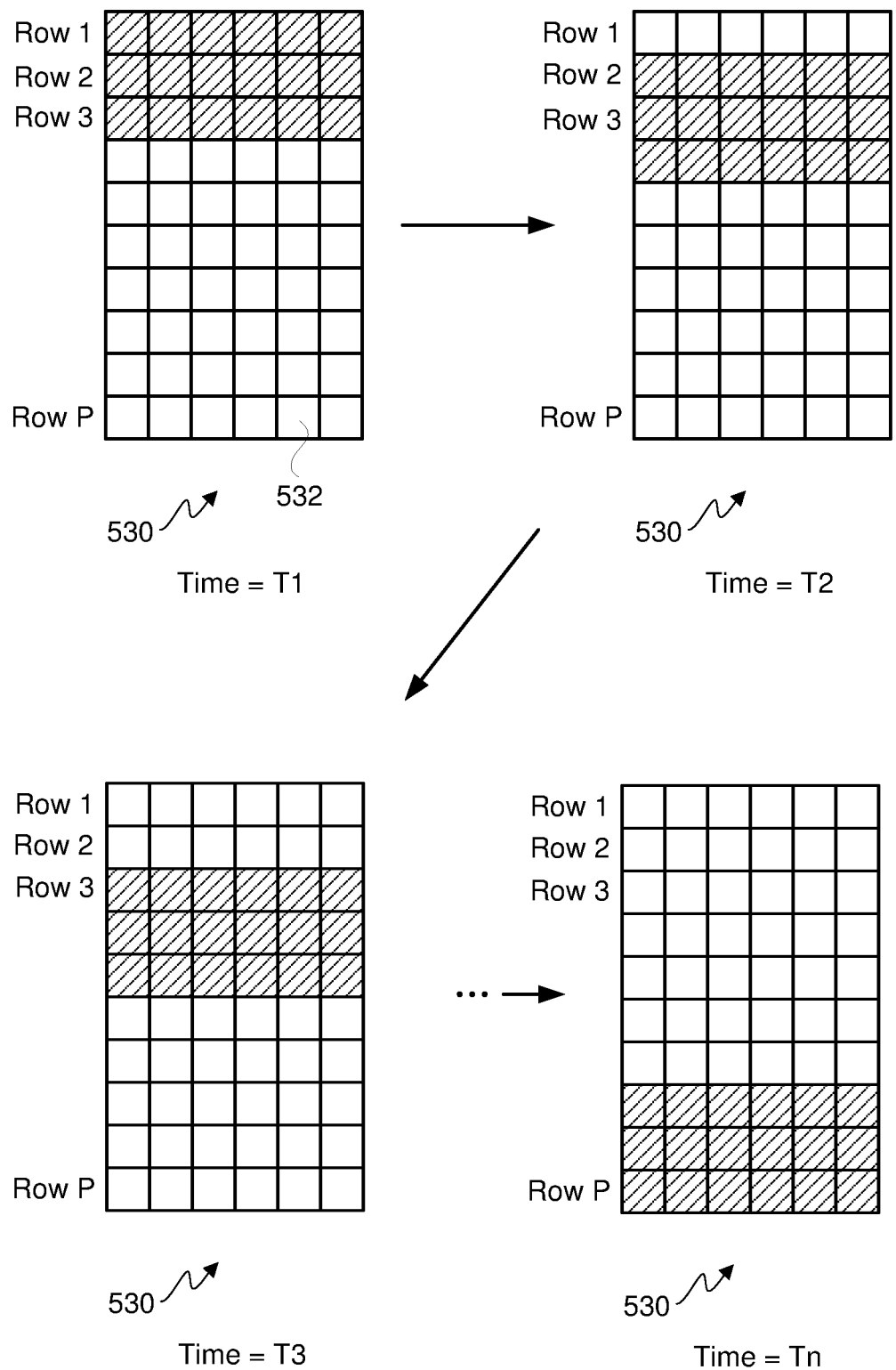
FIG. 5B shows diagrams that illustrate a formation of an image in an image field, in accordance with an embodiment.

FIG. 5B are diagrams illustrating a formation of an image in the image field 530 in a frame, in accordance with an embodiment. Row 1 and row P of the image field 530 may correspond to the row 1 and row p in FIG. 5A. For simplicity, only a few rows and columns of pixels 532 are shown in the image field 530. FIG. 5B shows different scan locations of the image field 530 at different times. A scan location herein refers to an area on which the light from the light emitters is projected. The illuminated pixels 532 are represented by hash patterned blocks in FIG. 5B.

The scanning is controlled by the rotation of the mirror 520 (shown in FIG. 5A). The light source 510 has multiple rows of light emitters 512. Owing to the physical distance separating each row of the light emitters 512, light from two rows of emitters 512 does not project on the same row of pixels 532 at the same time. Instead, the light from two rows of emitters 512 projects on different rows of pixels 532. As such, consecutive rows of pixels 532 are illuminated at one time. For simplicity, FIG. 5B illustrates an example with only three rows of light emitters 512 projecting light on the image field 530, but embodiments described herein may have more than three rows of light emitters 512.

By completing a scanning cycle (e.g. from T1 to Tn), an image is formed on the image field 530 per frame period. The actual color value and light intensity (brightness) of a given pixel 532 is a temporal average of the color values and light intensity during the frame period. Different detailed implementations on averaging the color value of a given pixel 532 are discussed further with reference to FIG. 7A through FIG. 10C. After completing a scan cycle, the mirror 520 reverts back to an initial position to project light onto the top rows of the image field 530 again, except that a new set of data signals may be fed to the light emitters 512. The same process may be repeated as the mirror 520 moves in cycles. As such, different images are formed in the scanning field 530 in different frames.

A frame period herein refers to a predetermined cycle time during which the entire image field 530 is completely scanned. A frame period is also associated with a cycle of movement of the mirror 520. The movement of the mirror 520 may be synchronized with the frame rate of the display device 500. For example, in one embodiment, the movement of the mirror 520 from an initial position that projects light to row 1 of the image field 530, to the last position that projects light to row p of the image field 530, and then back to the initial position is equal to a frame period.

Light Emitter Matrix

Figure 6:
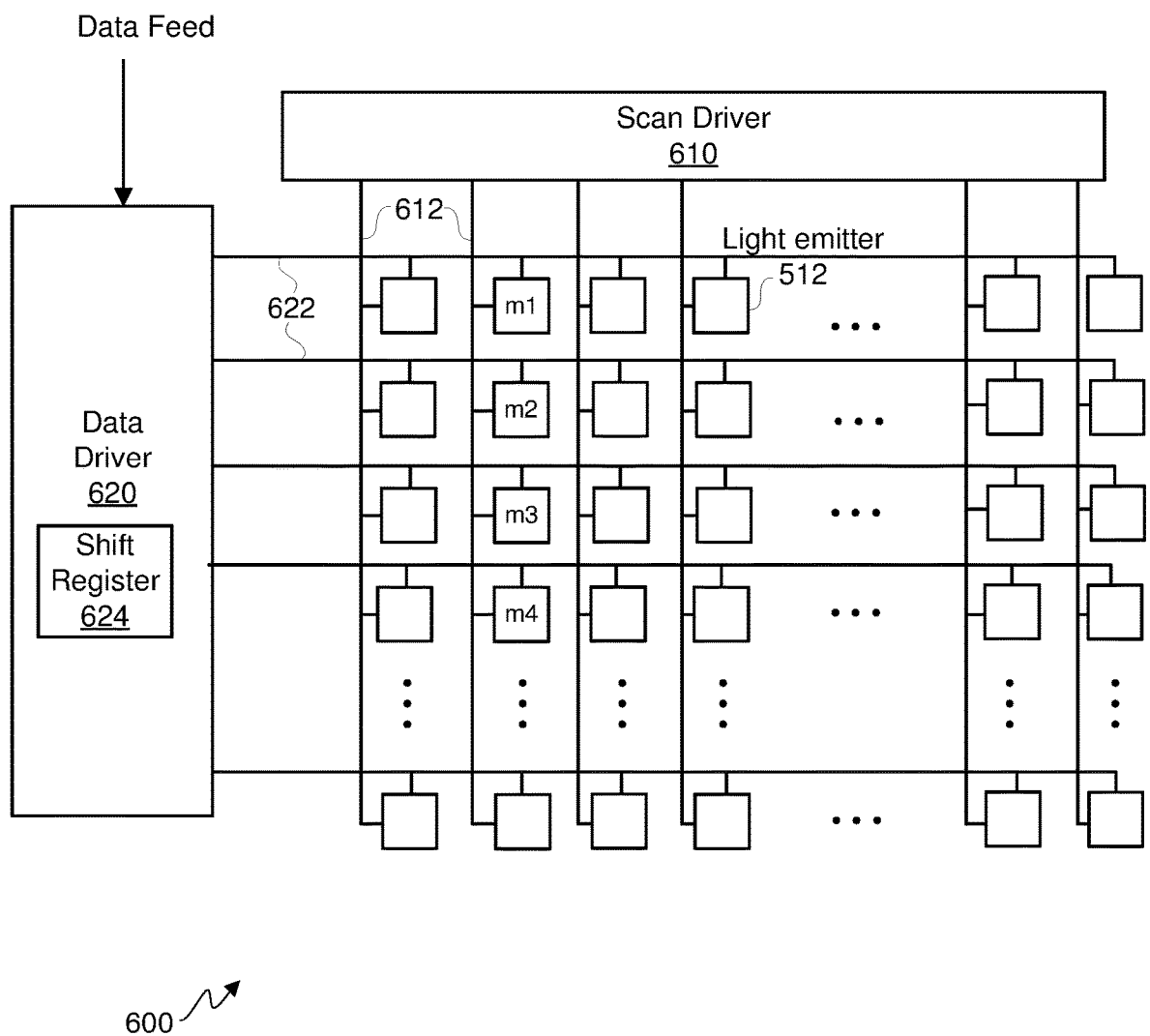
FIG. 6 is a block diagram illustrating structure of a light emitter matrix, in accordance with an embodiment.

FIG. 6 is a block diagram illustrating the structure of a light emitter matrix 600 of an example of the light source 510, in accordance with an embodiment. The matrix 600 may include, among other components, a scan driver 610, a data driver 620, and a plurality of light emitters 512 (represented by multiple square boxes) arranged in rows and columns. The light emitters 512 may be vertical cavity surface emitting laser (VCSEL) devices, light emitting diodes (LEDs) such as microLEDs and organic LEDs (OLED), tunable lasers, and/or some other light-emitting devices. The matrix 600 may include light emitters that emit different colors. For example, the matrix 600 may include a certain number of rows of Red light emitters, followed by a certain number of rows of Green light emitters, and followed by a certain number of rows of Blue light emitters. Alternatively, the matrix 600 may include multiple groups of sequentially arranged single row of Red light emitters, single row of Green light emitters, and single row of Blue light emitters (i.e., RBGRBGRBG . . . ). The exact order of red, Green, Blue may vary depending on embodiments.

The matrix 600 uses an active matrix addressing scheme to drive different light emitters 512. The data driver 620 provides data signals in data lines 622. The data lines 622 are connected to transistors that are in turn connected to each of the light emitters 512 in the row. The scan driver 610 provides scan signals via the scan lines 612 to the transistors connected to the light emitters 512. When a scan signal turns high or low, the transistors having their gates connected to the scan line are turned on, enabling a light emitter 512 in a column to turn on according to the voltage or duty cycle of the pulse-width modulation (PWM) signal provided by the data driver 620 as the data signal. By operating the scan signals, the light emitter 512 in different columns may receive the data signal for operating the light emitter 512. For example, at a given time, the data driver 620 provides a set of data signals. Each data signal in the set is provided to a light emitter 512 in a column that is scanned by the scan signal. Each data signal represents a data value. The data value controls a brightness level at which the light emitter 512 receiving the data signal operates.

The data signals can be shifted to by the shift register 624 from one light emitter 512 to another light emitter 512. In other words, in some cases, a data signal is first transmitted to one light emitter 512. Within the same frame, the same data signal is then shifted to another light emitter 512. The shifting may continue to a third light emitter, a fourth light emitter, etc. The shifting of data signals allows a less frequent loading of data signals by the data driver 620. Shifting data signals to different light emitters within a frame will be explained in further details with reference to FIG. 7A through 7C.

The matrix 600 may provide different advantages over a direct connection arrangement that connects each individual light emitter by a dedicated line. First, the number of signal lines is significantly reduced. For example, if there are 9 rows of light emitters arranged in 1280 columns, using a direct connection arrangement that connects each light emitter to an individual line will require 9 times 1280 lines. To the contrary, for the matrix 600 that uses active matrix addressing, the numbers of lines required are only 9 plus 1280 lines. Embodiments using the active matrix addressing requires fewer outputs from the IC driver and in turn reduces the cost and complexity of the IC driver.

Redundant Light Emitters

Figure 7A:
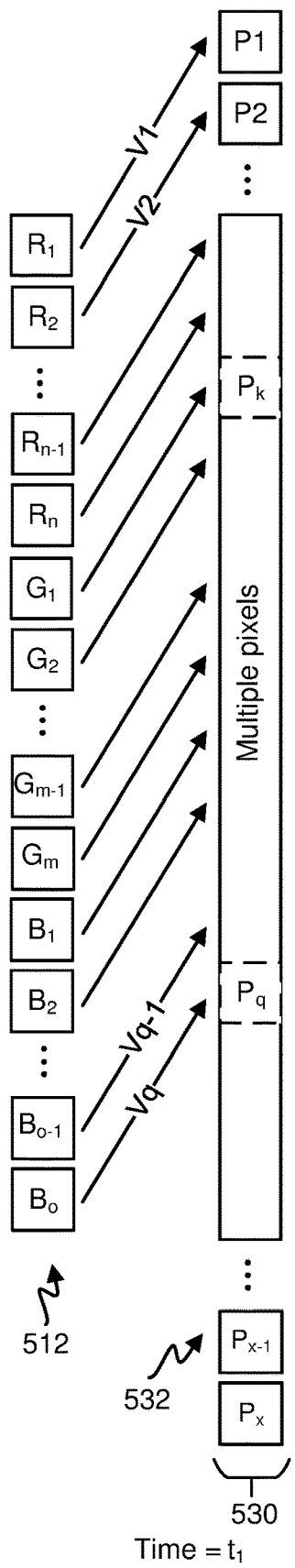
FIG. 7A through FIG. 7C are conceptual diagrams illustrating the spatial and temporal relationships between light emitters and pixels, in accordance with an embodiment.
Figure 7B:
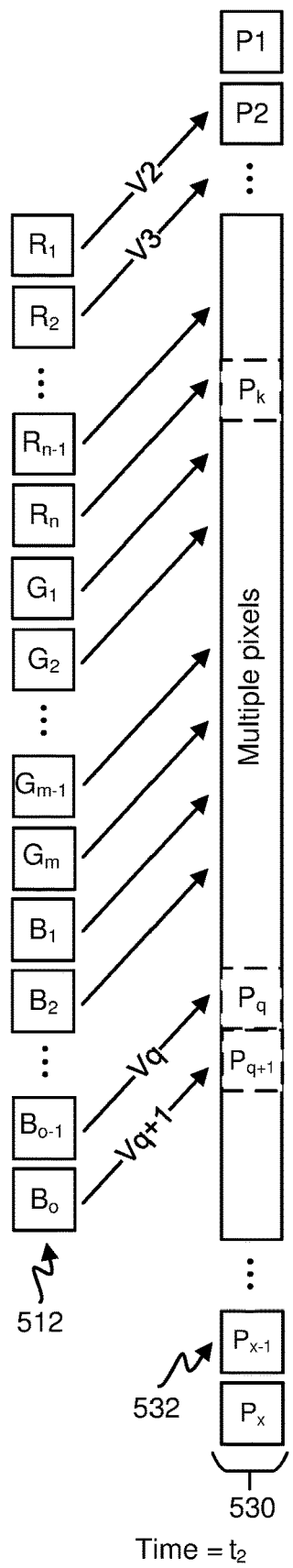
Figure 7C:
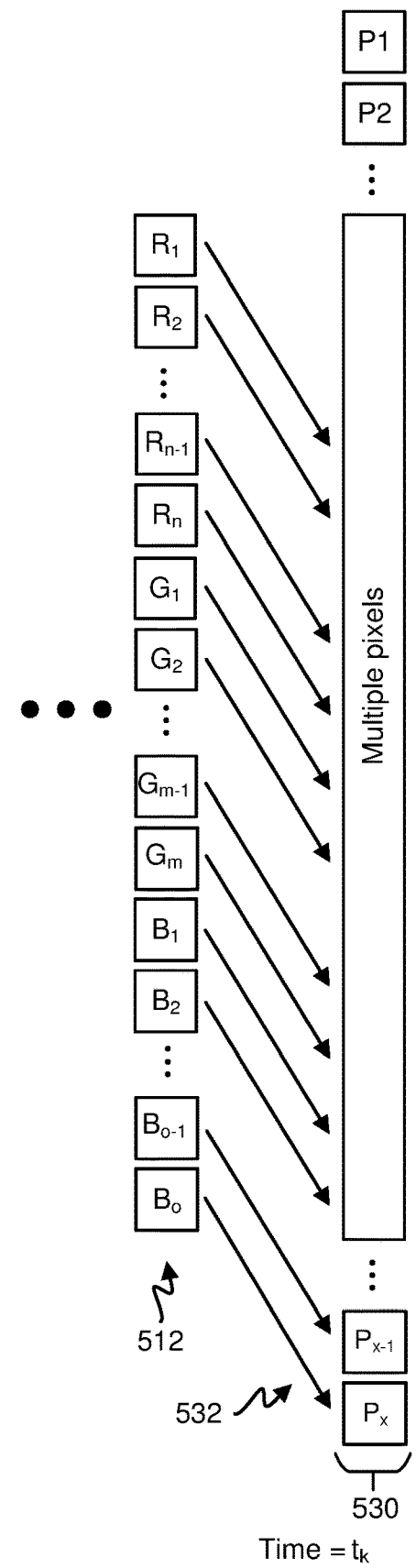

FIG. 7A through FIG. 7C are conceptual diagrams 700 illustrating the operations of the light emitters 512 in the matrix 600 and the spatial and temporal relationships between the light emitters 512 and the pixels 532 of the image field 530, in accordance with an embodiment. In this embodiment, the matrix 600 includes n rows of Red light emitters, m rows of Green light emitters, and o rows of Blue light emitters. For illustration purpose, a column of the light emitters 512 is shown and the individual light emitters are represented as square blocks labeled with R, G, or B with a subscripted number. The numbers m, n, and o, are larger or equal to two and can be the same or different. An image field 530 includes multiples rows of pixels 532. The blocks $P_1$, $P_2$, ..., $P_{x-1}$, and $P_x$ represent a column or a part of a column of individual pixels 532 in the image field 530. In one embodiment, the number of individual pixels 532 in a pixel column of the image field 530 is significantly larger (e.g. 50 to 10,000 times larger) than the number of individual light emitters 512 in an emitter column in the matrix 600. For simplicity, a certain number of pixels 532 in the middle of the pixel column are collectively represented by a single rectangular box.

FIG. 7A through FIG. 7C illustrates a formation of an image in a frame period, in accordance with an embodiment. The progression from FIG. 7A to FIG. 7C may correspond to a scanning operation illustrated in FIG. 5B within a frame. In FIGS. 7A, 7B, and 7C, each pixel, $P_1$, $P_2$, ..., or $P_x$, is illuminated by different light emitters 512, $R_1$, $R_2$, ... $G_1$, $G_2$, ... $B_{o-1}$, and $B_o$, at different times. The scan locations change over time and are controlled by the mirror 520 (shown in FIG. 5A). The labels of time $t_1$, $t_2$, etc. are for reference only. In one case the time $t_1$ is a starting portion of a frame period. In other cases, the time $t_1$ may also be an intermediate time period in a frame.

In FIG. 7A, representing time $t_1$ of a frame period, data driver 620 (shown in FIG. 6) provides a set of data to the light emitters 512. Each light emitter receives a data signal that represents a data value that controls the brightness (intensity level) of the light emitter. In response to receiving the data signal, the light emitter operates at the brightness level according to the data value for a portion of a frame period (e.g., for a subframe period). Meanwhile, the mirror 520 is at a first rotational orientation. During such time, pixel $P_1$ is illuminated by a Red light emitter $R_1$ having a brightness V1, pixel $P_2$ is illuminated by a Red light emitter $R_2$ having a brightness V2, pixel $P_q$ is illuminated by a Blue light emitter $B_o$ having a brightness Vq, etc. The scan location at time t1 covers pixels $P_1$ to an intermediate pixel $P_q$.

In FIG. 7B, representing a next time period $t_2$, the set of data signals (or a portion of the set) sent to the light emitters 512 is shifted by the shift register 624 (shown in FIG. 6). The mirror 520 rotates slightly to a second rotational orientation to project light onto next scan location that covers the pixel $P_2$ to an intermediate pixel $P_{q+1}$. As a result of the change in scan location, pixel $P_1$ is no longer illuminated but the pixel $P_{q+1}$ is now illuminated. Since the data signals are shifted, at time t2 the light emitter $R_1$ receives the data signal that was previously sent to light emitter $R_2$ in time $t_1$, the light emitter $R_2$ receives the data signal that was previously sent to light emitter $R_3$ in time $t_1$, etc. As a result of the shift in data signals as well as the rotation of the mirror 520, pixel $P_2$ continues to be illuminated by a Red emitter having the same brightness V2, pixel $P_q$ continues to be illuminated by a Blue emitter having a brightness Vq, etc. In other words, from time $t_1$ to $t_2$, a given pixel is illuminated by a first light emitter and then by a second light emitter. If the light emitters are in the same color, the brightness of the first light emitter illuminating on the pixel and the brightness of the second light emitter illuminating on the same pixel are the same because of the shift in data signals. Hence, the brightness of a given pixel for a particular color does not change during a frame period.

However, the pixels are also illuminated by light emitters of different colors during a frame period. For example, at time $t_1$ an intermediate pixel $P_k$ is illuminated by a Green light emitter $G_1$, while at time $t_2$ the pixel $P_k$ is illuminated by a Red light emitter $R_n$. The brightness level of $G_1$ and $R_n$ at these two different times may have no correlation.

The shifting of data signals and changing in scans locations may continue, as illustrated in FIG. 7C. The process may be carried out from the first row of pixels in the image field 530 until the entire image field 530 is scanned. As a result of this process, for a given frame period, each pixel may be illuminated by n Red light emitters, m Green light emitters, and o Blue light emitters. For a given pixel, the brightness among the n Red light emitters whose light is projected to the pixel at different times may remain the same within the same frame period. In contrast, the brightness level of each individual Red light emitter changes within the frame period as a result of the shift in signals and also because the emitter is projecting light onto different pixels within the frame period. Like the Red light emitters, the Green light emitters and the o Blue light emitters may also demonstrate the same type of pattern within the same frame. As a result, a given pixel displays an averaged color based on the temporal average of the brightness of the n Red light emitters, the m Green light emitters, and the o Blue light emitters.

In some situations, a single row of Red light emitters, a single row of Green light emitters, and a single row of Blue light emitters are sufficient to support the scanning operation to form an image. However, in some embodiments described herein, multiple additional rows of light emitters are added to the light source assembly. This creates redundancy in the number of light emitters. Owing to the redundancy, a pixel is illuminated by multiple light emitters of the same color within a frame. Such arrangement provides advantages over a single row arrangement, among other reasons, because only part of the brightness is lost if one light emitter becomes defective and other working light emitters may be overdriven by higher current to compensate for the loss in brightness due to the defective light emitter.

The redundancy may also provide better color mixing. In some embodiments, the brightness of a given pixel for a single color within a frame may not remain constant. The active matrix addressing method gives the flexibility of color mixing since different light emitters project light of different colors and brightness to a pixel. Also, the additional rows of light emitters can be placed in different orders compared to other rows of light emitters. Such arrangement can help to compensate visual artifacts such as color break and can improve perceptual and image quality.

The method and arrangement described in FIGS. 7A through 7C also increase the brightness of the image. With the single row method, a given color light is only projected on a pixel once within a frame. On the other hand, the redundancy method allows a pixel to be illuminated multiple times by multiple light emitters of the same color within a frame. Hence, the brightness of the pixel can be increased accordingly.

Figure 8:
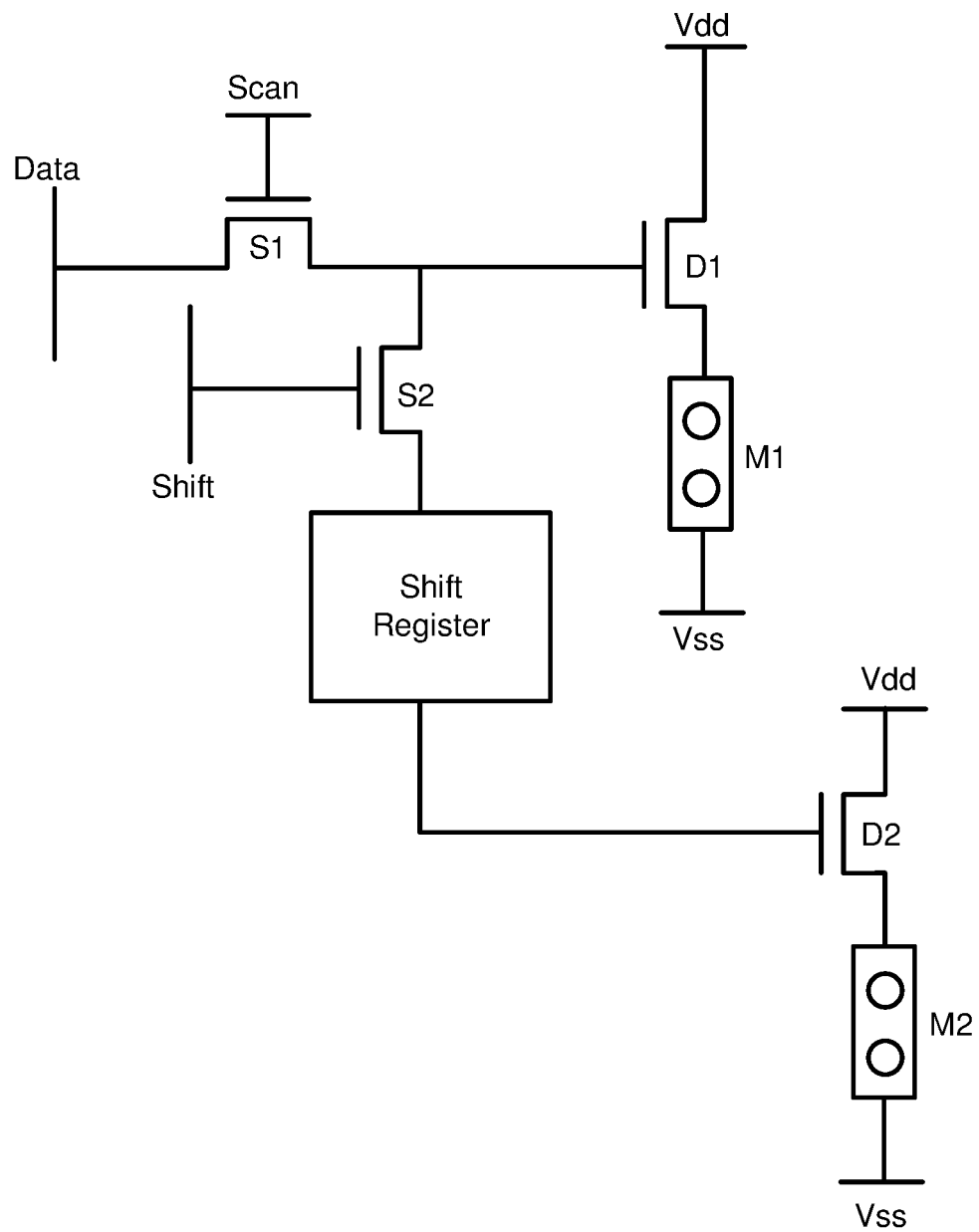
FIG. 8 is a circuit diagram illustrating an exemplary shift register circuit, in accordance with an embodiment.

FIG. 8 is a circuit diagram illustrating an exemplary shift register circuit, in accordance with one embodiment. The circuit of FIG. 8 may include, among components, two light emitters M1 and M2. Similar circuits can be constructed based on the architecture shown in FIG. 8 for other light emitters. The data voltage is shifted between two light emitters M1 and M2. The light emitter M1 is driven by a driving transistor D1 coupled between a high voltage source VDD and the light emitter M1. At time ti, the data signal is applied through DATA line and a SCAN signal is applied to turn on switch 51. As a result, the light emitter M1 is applied with the current from the high voltage source VDD to a low voltage drain VSS. At time $t_2$ after $t_1$, a SHIFT signal is applied to switch S2 to transfer the voltage level to the gate of the driving transistor D2 for operating the light emitter M2. The same SHIFT signal may be applicable to all light emitters in the same row. By doing so, the light emitter M2 at time $t_2$ is driven to the same brightness level as the light emitter M1 at time $t_1$.

Figure 9:
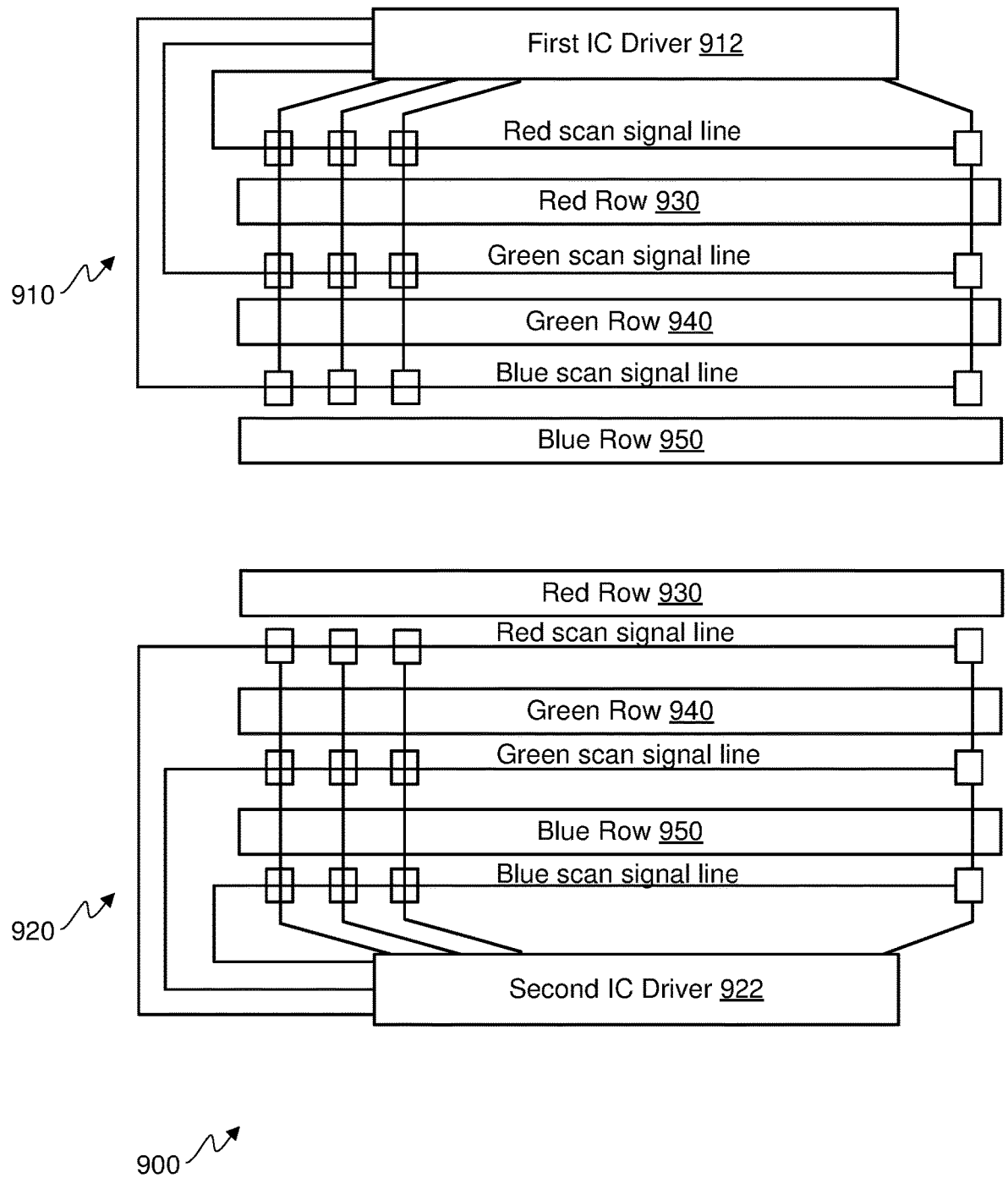
FIG. 9 is a block diagram illustrating an arrangement of a light source assembly that includes two or more integrated chips of light emitters, in accordance with an embodiment.

FIG. 9 is a diagram illustrating an arrangement of a light source assembly 900 including two or more micro integrated chips of light emitters, in accordance with an embodiment. The light source assembly 900 includes at least two integrated chips 910 and 920. Each integrated chip 910 or 920 includes a single row 930 of Red light emitters, a single row 940 of Green light emitters, and a single row 950 of Blue light emitters. The integrated chips 910 and 920 are respectively driven by a first IC driver 912 and a second IC driver 922 using an active matrix addressing scheme. The first IC driver 912 and the second IC driver 922 may be connected by the shift register circuit shown in FIG. 8 so that the same set of data signals can be transmitted to the first integrated chip 910 and shifted to the second integrated chip 920. As such, a light emitter in the second integrated chip 920 may have the same brightness as a corresponding light emitter in the first integrated chip 910 at the previous time step.

By using micro integrated chips, the average color of a pixel in the scan field may be controlled both temporally and spatially. For example, in one embodiment, a column of light emitters of different color illuminates a pixel in the scan field at different times. The resultant color of the pixel is the temporal average of the light emitted by the three emitters. In another embodiment, the Red row 930, the Green row 940, and the Blue row 950 in an integrated chip 910 or 920 are closely positioned so that three different-colored emitters in a column may illuminate light at the same pixel at a given mirror orientation. Each emitter may illuminate light at a subpixel location of the pixel. The resultant color of the pixel is the spatial average of the light emitted by the three emitters. In such embodiment, the second integrated chip and further additional integrated chips serve as redundant light sources that project light to the same pixel during other portions of a frame period, as discussed above.

Figure 10D:
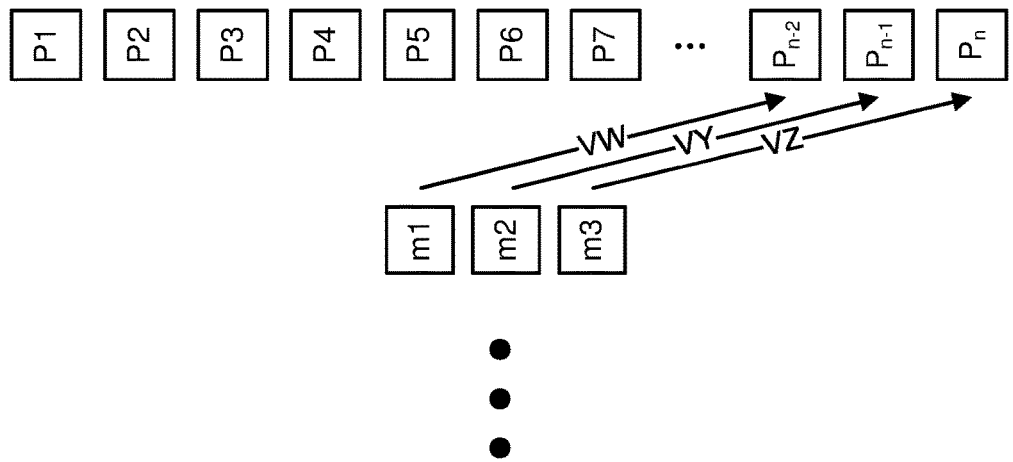
FIG. 10A through FIG. 10D are conceptual diagrams illustrating the operation of multiple light emitters, in accordance with an embodiment.
Figure 10C:
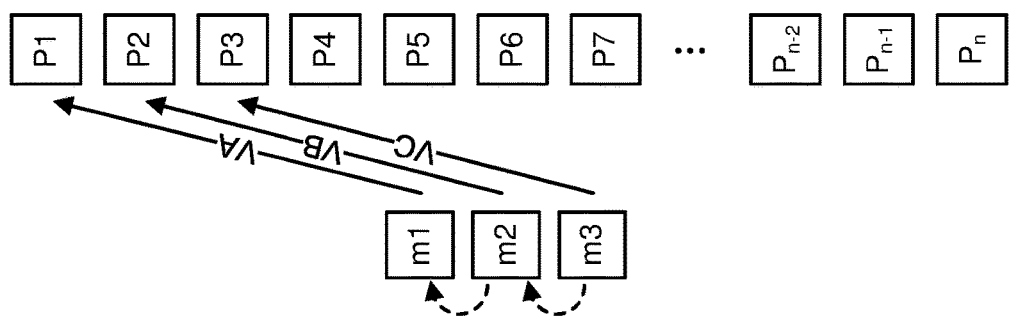
Figure 10B:
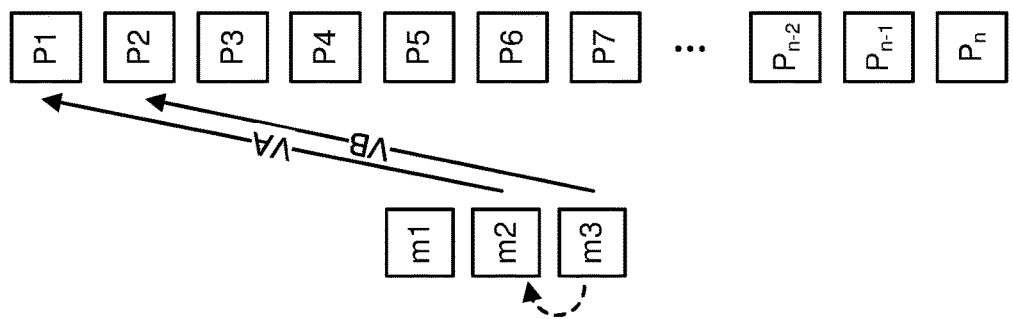
Figure 10A:
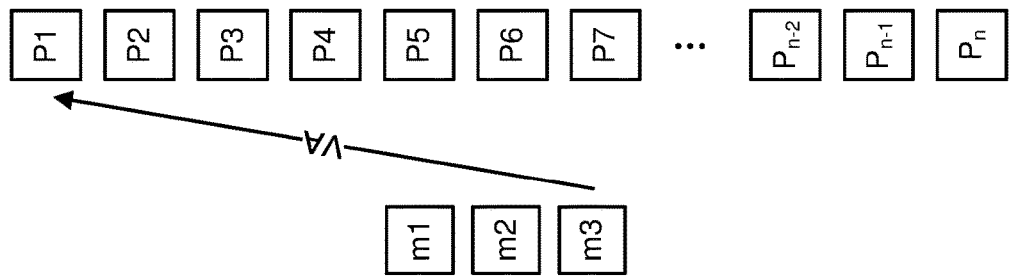

FIG. 10A through FIG. 10C are diagrams illustrating operations of multiple light emitters, in accordance with an embodiment. In this embodiment, the mirror 520 (shown in FIG. 5A) projects light from three light emitters m1, m2, and m3 onto the image field 530 simultaneously. The three light emitters may belong to three different integrated chips and might emit the same color.

FIG. 10A is a conceptual diagram illustrating light from the light emitters being projected to pixels in the image field 530 at time $t_1$ of a frame period, according to one embodiment. At time $t_1$, light emitter m3 is driven to brightness VA and its light is projected onto pixel P1 on the image field 530. Light emitters m1 and m2 do not project light onto any pixels at this time.

FIG. 10B is a conceptual diagram illustrating light from the light emitters being projected to pixels in the image field 530 at a time $t_2$ in the same frame period but subsequent to time $t_1$, according to one embodiment. At time $t_2$, the mirror 520 has tilted to project light from the light emitters m2 and m3 respectively to pixels P1 and P2. Time $t_2$ is still in the same frame as time $t_1$, and hence, the pixel P1 is lighted up with the same brightness VA as time $t_1$. For this purpose, the data signal for the light emitter m3 at time $t_1$ is shifted to the light emitter m2 at time $t_2$, as shown by a dashed arrow in FIG. 10B. At this time, light emitter m1 does not project light onto any pixels.

FIG. 10C is a conceptual diagram illustrating light from the light emitters being projected to pixels in the image field 530 at a time $t_3$ in the same frame period but subsequent to time $t_2$, according to one embodiment. At time $t_3$, the mirror 520 has tilted to project light from light emitters m1 through m3 to pixels P1 through P3, respectively. Time $t_3$ is still in the same frame as time $t_2$, and hence, the pixel P1 is lighted up with the same brightness VA as time $t_2$. Likewise, the pixel P2 is lighted up with the same brightness VB as time $t_2$. For this purpose, the data signals for the light emitters are shifted again, as shown by the dashed arrows in FIG. 10C. The process of shifting data signals and changing mirror orientation to project light on different pixels may continue for all of the pixels, as illustrated by FIG. 10D. In some cases, light emitters of different colors are also projected to the pixels in the same manner.

Offset Light Emitters

Figure 11:
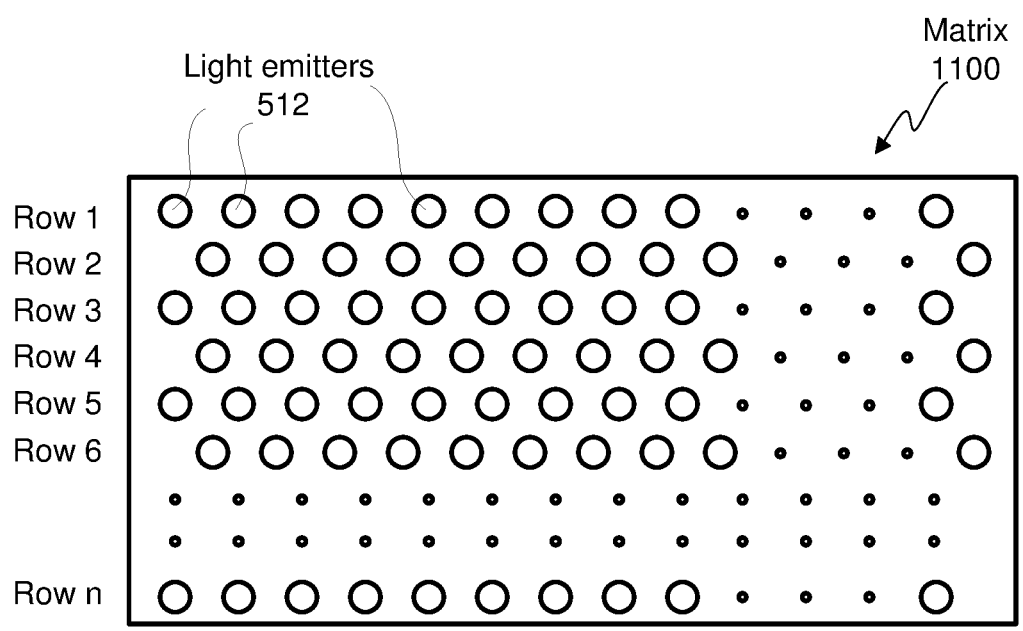
FIG. 11 is a diagram illustrating a matrix of light emitters having offset rows, in accordance with an embodiment.

FIG. 11 is a diagram illustrating an embodiment of a matrix 1100 having offset rows of light emitters 512. Rows that are offset in that light emitters 512 of each row do not align with rows above and/or below. For example, row 2 has light emitters 512 that are spaced a half column between light emitters 512 of row 1. Columns of the matrix 1100 can be offset by 0.25 to 0.5 of the spacing between light emitters 512. In this embodiment, light emitters 512 of odd-numbered rows align with each other; and light emitters 512 of even-numbered rows align with each other and are offset by 0.5 of the spacing between light emitters 512. The offset matrix 1100 can also adopt the scanning operation described in FIG. 7A through FIG. 7C. The offset arrangement of light emitters is further described in U.S. patent application Ser. No. 15/953,317, entitled "Super-Resolution Scanning Display for Near-Eye Displays," filed on Apr. 13, 2018, which is hereby incorporated by reference in its entirety for all purposes.

Operating Process

Figure 12:
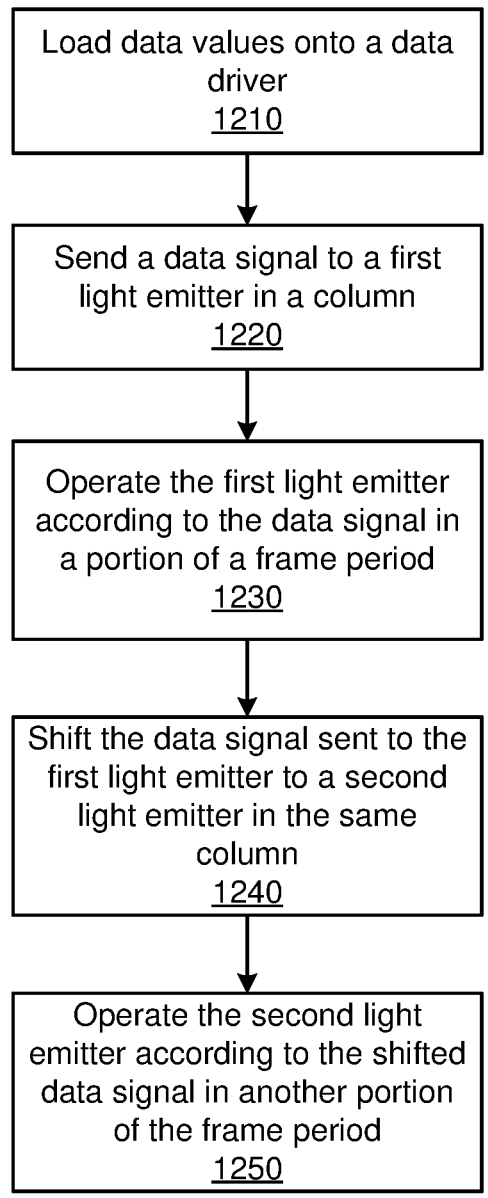
FIG. 12 is a flowchart depicting a process of operating a display device, in accordance with an embodiment.

FIG. 12 is a flowchart depicting a process of operating a display device, in accordance with an embodiment. The display device may include a controller that controls the light emitters of the display device. A rotatable mirror rotates and scans an image field to project different light patterns to different locations of the image field. For an image frame period, the controller loads 1210 data values onto a data driver. The data values may include a set of values with each value corresponding to a brightness level at which a light emitter operates.

The data driver controls the operations of light emitters in a manner that is synchronized with the rotation of the mirror. After the data values are loaded, the data driver sends 1220 a data signal representing a data value to a first light emitter in a column. Other data signals that represent data values in the set may also be sent to other light emitters in the column at the same time. The first light emitter operates 1230 at a brightness level according to the provided data signal in a first portion of a frame period. Meanwhile, the mirror is at a first orientation that projects the light of the first light emitter to a first pixel in a column on the image field. Light from other light emitters is also projected to other pixels on the image field in the first portion of the frame period.

The data driver then shifts 1240 the data signal representing the data value that was sent to the first light emitter to a second light emitter in the same column as the first light emitter. Other data signals sent to other light emitters may also be shifted. The second light emitter, in turn, operates 1250 at a brightness level according to the shifted data signal in a second portion of the frame period. The brightness level of the second light emitter may be the same as the brightness level of the first light emitter during the first portion of the frame period due to the shifted signal. Meanwhile, the mirror rotates to a second orientation. The light emitted by the second light emitter is projected onto the same first pixel in the column so that the same pixel is illuminated at the same brightness in the two portions of the frame period. Light from other light emitters is also projected to different pixels based on the second orientation of the mirror. The shifting of signals and rotation of mirror may continue for additional light emitters.

While the process is described with an example using a single column of light emitters, the process may have different variations and/or additions. For example, the process may be expanded for operating multiple columns of light emitters. During the first portion of a frame period, the data driver may simultaneously transmit different data signals to different light emitters that belong to a first row. During the second portion of the frame, the data driver may shift the set of different data signals to the next row of light emitters. A light emitter in the next row receives the data signal that is shifted from the light emitter of the first row that is located in the same column as the light emitter in the next row. The process may continue for a third row, a fourth row, etc. As a result, a row of pixels in the image field is illuminated two or more times in a frame period with each time having light from different rows of light emitters.

Also, the process may include shifting of data signals that allow a light emitter to operate at various brightness levels at different times. For example, the data driver may send a second data signal representing a second data value to a third light emitter in the same column as the first and the second light emitter during the first portion of the frame period. As such, the third light emitter operates at a brightness level according to the second data signal in the first portion of the frame period. Meanwhile, the first light emitter operates at a brightness level according to the first data signal in the first portion of the frame period. The data driver then shifts the second data signal to the first light emitter in the second portion. Hence, the first light emitter operates at a brightness level according to the shifted second data signal in the second portion of the frame period. In other words, the first light emitter operates at different brightness levels at different times during the frame period. The light of the first light emitter is first projected to a first pixel in the first portion of the frame period then to a second pixel in the second portion of the frame period.

While the process in FIG. 12 is described with light emitters emitting light with same brightness level to the same pixel, some embodiments may include changes of data signals among the light emitters such that the same pixel is illuminated by light of the same color but different brightness within a frame period. In addition, the light emitters in a column may also have different colors. For example, a first and a second light emitter in a column may have a first color while a third and a fourth light emitter in the same column may have a second color.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
    loading data values onto a data driver of a display device;
    sending a data signal representing a data value to a first light emitter in a column;
    operating the first light emitter according to the data signal in a first portion of a frame period;
    shifting the data signal to a second light emitter in the same column as the first light emitter; and
    operating the second light emitter according to the shifted data signal in a second portion of the frame period, wherein light emitted from the first light emitter is projected to a pixel in the first portion of the frame period and light emitted from the second light emitter is projected to the same pixel in the second portion of the frame period.

2. The method of claim 1, wherein the first light emitter is operated at a brightness level in the first portion of the frame period according to the data signal and the second light emitter is operated at the same brightness level in the second portion of the frame period according to the shifted data signal.

3. The method of claim 1, wherein the first light emitter and the second light emitter are micro-LEDs.

4. The method of claim 1, wherein the first light emitter and the second light emitter emit the same color of light.

5. The method of claim 1, further comprising:
    sending a second data signal representing a second data value to a third light emitter in the column;
    operating the third light emitter according to the second data signal in the first portion of the frame period;
    shifting the second data signal to the first light emitter; and
    operating the first light emitter according to the shifted second data signal in the second portion of the frame period.

6. The method of claim 5, wherein, in the first portion of the frame period, light emitted from the first light emitter is projected to a first pixel and light emitted from the third light emitter is projected to a second pixel next to the first pixel, and
    wherein, in the second portion of the frame period, light emitted from the second light emitter is projected to the first pixel and light emitted from the first light emitter is projected to the second pixel.

7. The method of claim 1, further comprising:
    sending a second data signal representing a second data value to a third light emitter in the column;
    operating the third light emitter according to the second data signal in the first portion of the frame period;
    shifting the second data signal to a fourth light emitter in the column; and
    operating the fourth light emitter according to the shifted second data signal in the second portion of the frame period.

8. The method of claim 7, wherein the first light emitter emits a first color of light and the third light emitter emits a second color of light different than the first color.

9. The method of claim 7, wherein a pixel is illuminated by the first light emitter, the second light emitter, the third light emitter, and the fourth light emitter in the frame period.

10. A display device, comprising:
    a column of light emitters comprising a first light emitter and a second light emitter;
    a rotatable mirror configured to project light from the column of light emitters to an image field; and
    a data driver configured to:
        send a data signal representing a data value to the first light emitter to cause the first light emitter to operate according to the data signal in a first portion of a frame period, and
        shift the data signal to the second light emitter to cause the second light emitter to operate according to the shifted data signal in a second portion of the frame period, wherein the rotatable mirror is configured to rotate to a first position in the first portion of the frame period to project light emitted from the first light emitter to a pixel of the image field, and wherein the rotatable mirror is configured to rotate to a second position in the second portion of the frame period to project light emitted from the second light emitter to the same pixel.

11. The display device of claim 10, wherein the column of light emitters comprises two red light emitters, two green light emitters, and two blue light emitters.

12. The display device of claim 10, wherein the rotatable mirror is a microelectromechanical system mirror.

13. The display device of claim 10, wherein the column of light emitters further comprises a third light emitter, the third light emitter is configured to operate according to a second data signal in the first portion of the frame period, and the first light emitter is configured to operate in the second portion of the frame period according to the second data signal shifted from the third light emitter.

14. The display device of claim 10, wherein the frame period corresponds to a movement cycle of the mirror.

15. A display device, comprising:
a column of light emitters comprising two or more red emitters, two or more green emitters, and two or more blue emitters; and
a rotatable mirror configured to project the light emitted from the column of light emitters to an image field, wherein the rotatable mirror is configured to rotate to a first position to project the light emitted from the column of light emitters to a first area of the image field in a first portion of a frame period and is configured to rotate to a second position to project the light emitted from the column of light emitters to a second area of the image field in a second portion of the frame period, wherein a first red emitter of the two or more red emitters is configured to emit light of a brightness level in the first portion of the frame period and a second red emitter of the two or more red emitters is configured to emit light of the same brightness level in the second portion of the frame period.

16. The display device of claim 15, wherein the light emitted from the first red emitter is projected by the rotatable mirror to a pixel of the image field in the first portion of the frame period and the light emitted from the second red emitter is projected by the rotatable mirror to the same pixel of the image field in the second portion of the frame period.

17. The display device of claim 15, wherein a pixel of the image field is illuminated by the two or more red emitters, the two or more green emitters, and the two or more blue emitters within the frame period.

\* \* \* \* \*